UNITED STATES PATENT OFFICE.

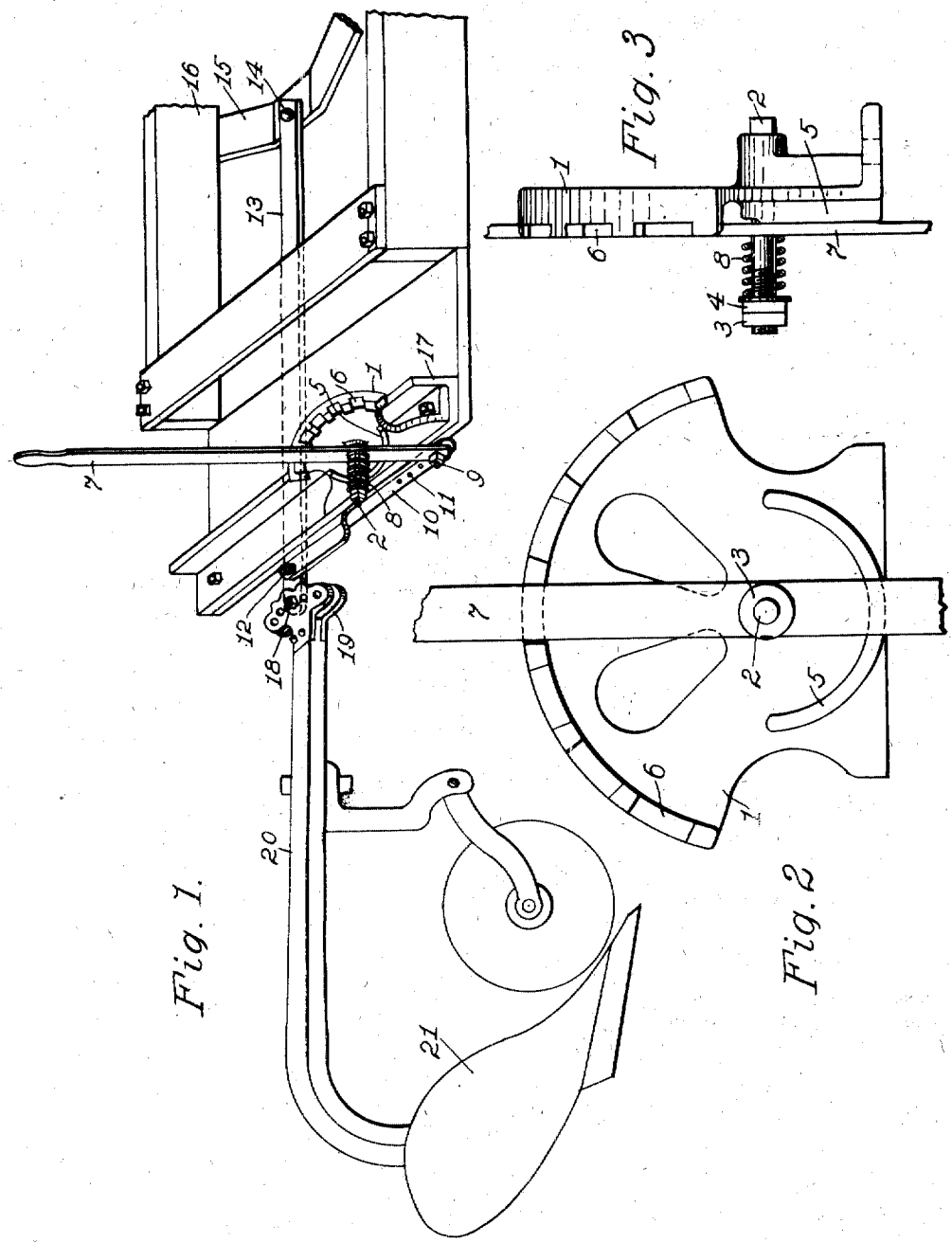
L. W. WITRY.
IMPLEMENT SHIFTING MEANS FOR TRACTORS.
APPLICATION FILED MAY 24, 1916.
1,217,257.  Patented Feb. 27, 1917.
Inventor,
L. W. Witry, by
G. C. Kennedy,
Attorney.

LOUIS W. WITRY, OF WATERLOO, IOWA, ASSIGNOR TO WATERLOO GASOLINE ENGINE COMPANY, OF WATERLOO, IOWA.

IMPLEMENT-SHIFTING MEANS FOR TRACTORS.

1,217,257. Specification of Letters Patent. Patented Feb. 27, 1917.

Application filed May 24, 1916. Serial No. 99,563.

*To all whom it may concern:*

Be it known that I, LOUIS W. WITRY, a citizen of the United States of America, and a resident of Waterloo, Blackhawk county, Iowa, have invented certain new and useful Improvements in Implement-Shifting Means for Tractors, of which the following is a specification.

My invention relates to improvements in plow shifting mechanism for tractors, and the object of my improvement is to supply for tractors or other like self-propelled vehicles or any propelling means, a device capable of employment for horizontally shifting the plow or other implement attached thereto transversely relative to the line of direction thereof.

This object I have accomplished by the means which are hereinafter described and claimed, and which are illustrated in the accompanying drawings, in which:

Figure 1 is a detail view of my improved shifting means as operatively connected between the rear part only of the frame of a tractor, and a plow drawn thereby.

Fig. 2 is an enlarged rear elevation of the rack-segment of said invention, with shifting-lever connected thereto, and broken away.

Fig. 3 is a side elevation of said rack-segment and lever.

Similar numerals of reference denote corresponding parts throughout the several views.

Referring to Fig. 1, the rear part of the frame only of a tractor is shown, comprising the side-beams 16 with connections, rear platform with angle-bar 17 mounted thereon, and a medially depressed cross-bar 15 connecting the two side-beams 16. A horizontally swinging bar 13 has its front end orificed as is also the cross-bar 15 to both receive a pivot-bolt 14, the bar 13 extending rearwardly beyond the platform and its angle-bar 17.

On the angle-bar 17 is fixed a rack-segment 1, having a plurality of radial grooves 6. The rack-segment is centrally orificed to seat a pivot-pin or bolt 2 extending rearwardly therefrom to serve as a pintle for the manually operated shifting-lever 7, the latter being adapted to seat itself in either of the grooves 6, when first pushed outwardly against the coiled compression-spring 8 mounted about the pin 2 and secured thereon by nuts 3 and 4, and then released to be held releasably secured in the groove by the compulsion of the spring. The lower end of the lever slides over a semi-circular boss 5 on the rack-segment so that the spring works only on the upper half of the lever to keep it sprung into a notch of the rack-segment. The rear end of the bar 13 is orificed, and a connecting-rod 10 is also orificed, the two being pivotally connected by a bolt 12, while the other end of the rod 10 is pivotally connected to the lower end of the lever 7 adjustably by a bolt 9, inserted in one of the orifices 11 in said rod.

By another bolt 18, the orificed head 19 of a beam 20, carrying a plow share 21, or any other implement, may be detachably connected to the rear end of the bar 13.

The hand-lever 7 may be shifted to shift the bar 13 swingingly from side to side horizontally, to likewise shift the implement 21 laterally.

The device may be applied to any form of tractor or other propelling means, and to gangs of plows or other implements drawn thereby.

Having described my invention, what I claim as new, and desire to secure by Letters Patent, is:

Implement shifting means, comprising a laterally-swinging draft-connection pivoted to the frame of a tractor or the like, a radially-notched rack-segment mounted on said frame, a lever pivoted on said segment and adapted to enter any of said notches, a semi-circular boss on said segment, concentric with said notches, and below the pivotal connection of the lever to serve as a support for the lever to slide over, and a coiled compression-spring mounted upon the segment to exercise a yielding pressure upon the lever to hold the upper part thereof in any notch of the rack-segment.

Signed at Waterloo, Iowa, this 8th day of May, 1916.

LOUIS W. WITRY

Witnesses:
PEARL M. STANTON,
G. C. KENNEDY.